United States Patent
Rabasco et al.

[11] Patent Number: 6,096,826
[45] Date of Patent: Aug. 1, 2000

[54] PIPERIDONE FUNCTIONALIZED POLY (VINYL ALCOHOL)

[75] Inventors: John Joseph Rabasco, Macungie; Eric Howard Klingenberg; Gregory Paul Dado, both of Emmaus; Robert Krantz Pinschmidt, Jr., Allentown; John Richard Boylan, Bethlehem, all of Pa.

[73] Assignee: Air Products and Chemicals, Inc., Allentown, Pa.

[21] Appl. No.: 09/119,563

[22] Filed: Jul. 21, 1998

[51] Int. Cl.[7] .................................................. C08F 8/00
[52] U.S. Cl. ........................ 525/61; 508/263; 508/262; 546/184; 546/186; 546/245
[58] Field of Search ............... 525/61; 508/262, 508/263; 546/184, 186, 245

[56] References Cited

U.S. PATENT DOCUMENTS

| | | | |
|---|---|---|---|
| 4,085,168 | 4/1978 | Milkovich et al. | 260/886 |
| 4,233,410 | 11/1980 | Rody et al. | 525/123 |
| 5,380,403 | 1/1995 | Robeson et al. | 162/147 |

*Primary Examiner*—David W. Wu
*Assistant Examiner*—Kelechi C. Egwim
*Attorney, Agent, or Firm*—Mary E. Bongiorno

[57] ABSTRACT

A family of piperidone functionalized polymers based on polymers containing a plurality of hydroxyl groups. Piperidone or piperidone derivatives form a cyclic ketal linkage with hydroxyl groups contained on adjacent or alternating carbon atoms of the base polymer. Preferred compositions are piperidone functionalized poly(vinyl alcohol) having the following general formulae:

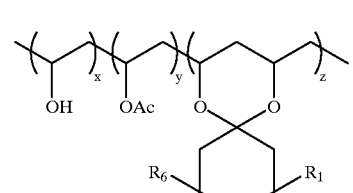

or

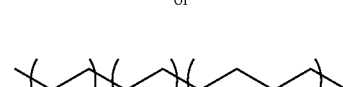

wherein $R_1$ through $R_6$ are each independently hydrogen, methyl, or a $C_2$ to $C_4$ saturated or unsaturated alkyl groups, $R_7$ is O• or $OR_8$, wherein $R_8$ is hydrogen or a $C_1$ to $C_4$ alkyl or C(=O)alkyl group; $X^-$ is a salt; x ranges from 50 to 99 mol %; y ranges from 0 to 30 mol %; and z ranges from 1 to 20 mol %. The compounds are useful in ink jet paper coating applications.

17 Claims, No Drawings

PIPERIDONE FUNCTIONALIZED POLY (VINYL ALCOHOL)

BACKGROUND OF THE INVENTION

Amine functionalized poly(vinyl alcohol) can be prepared in a variety of ways. For example, vinyl acetate can be copolymerized with amine functional monomers, such as 3-(trimethylammonium)propylacrylamide chloride, followed by hydrolysis of the acetate groups to form the corresponding vinyl alcohol copolymer. Vinyl acetate can also be copolymerized with N-vinylformamide or N-vinylacetamide to produce a copolymer which upon subsequent hydrolysis forms a poly(vinyl alcohol)-copoly (vinylamine) copolymer. Other monomers which have been copolymerized with vinyl acetate include, 2-(dimethylamino)ethyl methacrylate, 2-(diethylamino) ethyl methacrylate, 2-(dimethylamino)ethyl acrylate, 3-(dimethylamino)-2,2-dimethylpropyl acrylate, 2-(diethylamino)ethyl acrylate, 4-vinylpyridine, and allylamine. This synthetic approach can be limited in some instances due to the reactivity ratios of the monomers involved, the low solubility of some amino monomers in methanol (which is the solvent most often used to produce these copolymers), the low level of incorporation of the amino monomer into the copolymer chain, and the instability of some amino-containing copolymer repeat units under the strongly basic saponification conditions.

Alternate synthetic strategies to synthesize amine functional poly(vinyl alcohol) involve the chemical modification of poly(vinyl alcohol) homopolymer or vinyl alcohol-vinyl acetate copolymer (typically containing 1–12% vinyl acetate repeat units). For example, U.S. Pat. No. 5,380,403 (Robeson et al., 1995) discloses the transacetalization of an aminoaldehyde dialkyl acetal such as 4-aminobutyraldehyde dimethyl acetal with poly(vinyl alcohol) under acid catalysis in a homogeneous aqueous system or in a heterogeneous methanol system to produce an amine modified poly(vinyl alcohol).

Amine functional poly(vinyl alcohol) has also been made by graft polymerization of poly(vinyl alcohol) with aminoalkyl methacrylate or aminoalkyl acrylate. Other examples of producing amine functional poly(vinyl alcohol) using a poly(vinyl alcohol) post-modification synthetic approach include the etherification of poly(vinyl alcohol) with epichorohydrin followed by reaction with an amine, etherification with glycidyltrimethylammonium chloride, modification with nitrile derivatives followed by hydrogenation to the corresponding amine, and Michael reaction of acrylamide followed by Hofmann degradation. However, the above strategies do not involve straightforward reactions due to processing difficulties or side reactions, such as crosslinking.

New amine functionalized vinyl alcohol polymers and methods of making them are of continuing interest because of the recognized usefulness of the materials in a number of application areas. These polymers have proven to be useful in the paper industry for the papermaking process such as sizing, paper coatings, thermal papers, ink jet paper coatings, and creping adhesives. Amine functionalized poly (vinyl alcohol) derivatives also provide enhanced performance as flocculants, thickeners, and emulsion or colloidal stabilizers to produce positively charged emulsions. They display behavior typical of polyelectrolytes and selectively adsorb to negatively charged materials such as pulp, fiber, and glass from aqueous solutions.

A variety of amine functional poly(vinyl alcohol)s are known; however the amine functional poly(vinyl alcohol)s of this invention, especially those in which piperidone or its derivatives are incorporated into the poly(vinyl alcohol) structure by cyclic ketalization, have not been reported.

BRIEF SUMMARY OF THE INVENTION

The present invention is directed to a unique family of amine functionalized polymers which are formed from reaction of piperidone or a piperidone derivative with a polymer having a plurality of pendent hydroxyl groups on adjacent or alternating carbons on the polymer chain. Piperidone or a piperidone derivative having one or more $C_1$ to $C_4$ alkyl groups attached to a ring atom and/or an oxy, oxyalkyl or $O(C=O)$-alkyl group attached to the nitrogen atom, reacts with the hydroxyl groups to form a cyclic ketal linkage. The invention is especially directed to piperidone functionalized poly(vinyl alcohol) having the general formulae:

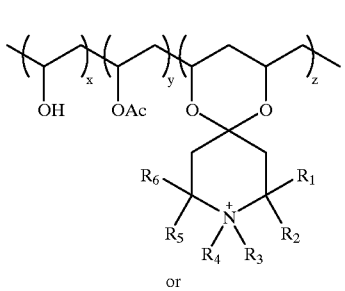

I

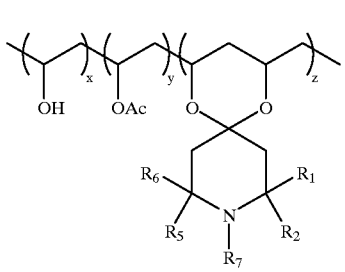

II wherein $R_1$ through $R_6$ are each independently hydrogen, methyl, or $C_2$ to $C_4$ saturated or unsaturated alkyl group; $R_7$ is O• or $OR_8$, wherein $R_8$ is hydrogen, a $C_1$ to $C_4$ alkyl group, or a $C(=O)$-$(C_1$ to $C_4)$-alkyl group. $X^-$ is a salt, such as chloride, sulfate, hydrogen sulfate, methanesulfonate, phosphate, or nitrate; x ranges from 50 to 99 mol %, y ranges from 0 to 30 mol %, and z ranges from 1 to 20 mol %.

Especially preferred cyclic amines are piperidone derivatives such as, 2,2,6,6-tetramethyl-4-piperidone, 2,2,6,6-tetramethyl-4-piperidone-1-oxyl, 4-piperidone, and N-methyl-4-piperidone.

Piperidone modified poly(vinyl alcohol) compositions are shown to provide enhanced performance in ink jet paper coating applications resulting in high optical density images on the printed ink jet paper, as well as excellent water and light resistance. Piperidone modified poly(vinyl alcohol) compositions are expected to provide enhanced performance for different aspects of papermaking, such as paper wet strength improvement or internal sizing, creping adhesives, and improved properties of recycled paper. They are also expected to provide excellent light stabilization since many of the piperidone synthons are marketed as hindered amine light stabilizers (HALS). Other potential applications include the use of amine functional poly(vinyl alcohol) as flocculants, thickening agents, emulsion stabilizers, and low temperature crosslinkers.

DETAILED DESCRIPTION OF THE INVENTION

The present invention is directed to a unique family of piperidone functionalized polymers formed from a polymer having a plurality of pendent hydroxyl groups that are on adjacent or alternating carbon atoms and piperidone or a piperidone compound having one or more $C_1$ to $C_4$ saturated or unsaturated alkyl substituent groups on the ring and/or an oxy, a $C_1$ to $C_4$ oxyalkyl or an $O(C=O)$-alkyl substituent on the nitrogen. The piperidone compound reacts with the hydroxyl groups on the polymer to form a cyclic ketal linkage.

Preferred piperidone functionalized polymers are piperidone functionalized poly(vinyl alcohol) having the following general formulae:

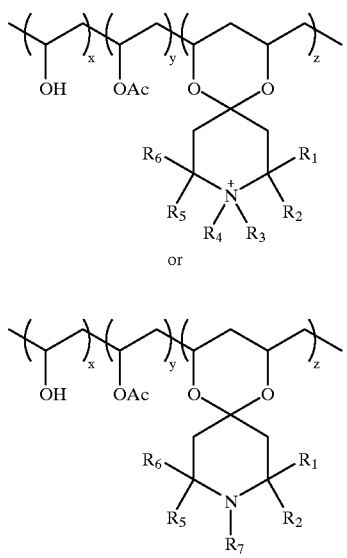

wherein $R_1$ through $R_6$ are each independently hydrogen, methyl, or a $C_2$ to $C_4$ saturated or unsaturated alkyl group, and $R_7$ is O• or $OR_8$, wherein $R_8$ is hydrogen, a $C_1$ to $C_4$ alkyl or a $C(=O)$-alkyl group. $X^-$ is a salt, such as chloride, sulfate, hydrogen sulfate, methanesulfonate, phosphate, or nitrate; x ranges from 50 to 99 mol %; preferably 73–94 mol %, y ranges from 0 to 30 mol %, preferably 1–12 mol %, and z ranges from 1 to 20 mol %, preferably 5–15 mol %. Examples of alkyl groups are ethyl, propyl, isopropyl, n-butyl, isobutyl, tert-butyl, 2-propenyl, and 3-butenyl.

The process for preparing a piperidone modified polymer involves the ketone moiety of the cyclic amines reacting with the hydroxy groups on the polymer via a ketalization reaction to form the corresponding cyclic ketal.

A typical synthetic procedure involves swelling particles of a polymer containing polymerized vinyl alcohol units, particularly poly(vinyl alcohol), in a solvent which is capable of diffusing into the polymer particles causing swelling or volume increase of the particles to produce a heterogeneous slurry. Examples of suitable solvents are methanol, ethanol, tetrahydrofuran, dimethyl sulfoxide, dimethyl formamide, acetic acid, and combinations thereof. In the preferred embodiment, alcoholic solvents, such as methanol or ethanol, are used for several reasons: 1) they have an enhanced ability to swell the poly(vinyl alcohol) to a significant extent, 2) they completely dissolve the acid neutralized piperidone salts which aids reactivity with poly (vinyl alcohol) and allows for the efficient removal of any unreacted piperidone reagent from the final piperidone modified poly(vinyl alcohol) product, 3) they are more compatible with strong inorganic acid catalysts, and 4) they are sufficiently volatile to facilitate removal from the final product copolymer.

After the polymer particles have swollen sufficiently, the piperidone reagent is added to the slurry in an amount which will produce a polymer containing 1 to 20 mol %, preferably 5 to 15 mol % piperidone ketal. The acid catalyst is then added to the slurry. The resulting slurry is then stirred at refluxing temperatures (for example, 65° C. when methanol is the solvent) for a given period of time. Typically, the reaction time ranges from about 5 to 8 hours. The piperidone reagent and acid catalyst can be added together to the reaction slurry. If the piperidone reagent is in its free base form, it is preferable to add the acid catalyst dropwise due to the exothermic nature of the neutralization reaction.

A variety of piperidone derivatives can be used in this synthetic approach to prepare a number of different piperidone functionalized poly(vinyl alcohol) compositions. Examples of preferred piperidone derivatives are 4-piperiodone, 2,2,6,6-tetramethyl-4-piperidone, 2,2,6,6-tetramethyl-4-piperidone-1-oxyl, and N-methyl-4-piperidone.

Polymers having a plurality of pendent hydroxyl groups can be formed by the polymerization of vinyl or acrylic esters in which the ester unit contains from 1 to 4 carbon atoms. The pendent ester groups, when hydrolyzed, form polymers containing pendant hydroxyl groups. One class of polymers having a plurality of hydroxyl groups are based upon hydrolyzed vinyl acetate polymers wherein vinyl acetate is polymerized as a homopolymer or in conjunction with other monomers to form copolymers and are known as poly(vinyl alcohol) or vinyl alcohol copolymers. The mol percent of vinyl acetate should be sufficient to provide sufficient hydroxyl functionality to permit reaction with the piperidone compound and provide sufficient levels of amine functionality to the polymer. Typically the vinyl ester, specifically vinyl acetate, will comprise from 60 to 100% of the copolymer, preferably at least 90 mole percent of the polymer. The poly(vinyl alcohol) used in this invention, generally, has a weight average molecular weight ($M_w$) ranging from about 5,000 to 300,000, preferably 10,000–200,000) Alternatively, the poly(vinyl alcohol) can have a degree of polymerization (Dp) of from 100 to 5,000, preferably 200 to 3500. Commercially, poly(vinyl alcohol) is made by the hydrolysis of poly(vinyl acetate) and typically has a hydrolysis level ranging from about 85 to greater than 99%. The level of hydrolysis can range from 50% to greater than 99%, preferably 85% to 98%, for this invention.

A variety of monomers may be copolymerized with a vinyl ester to produce polymers containing vinyl alcohol units. Monomers which can be polymerized with the vinyl ester, preferably vinyl acetate, include ethylene, unsaturated acids such as maleic, acrylic and methacrylic acid, and esters, such the $C_1$ to $C_{12}$, preferably $C_1$ to $C_6$ alkyl esters of acrylic or methacrylic acid. In many instances, these polymers can be hydrolyzed to produce different grades of poly(vinyl alcohol) including, for example, hydrolyzing only the vinyl ester and leaving the acrylic ester functionality intact. Other monomers having from 2 to 12 carbon atoms such as alkyl maleates (e.g., dibutyl maleate and the like) may be polymerized as desired with vinyl acetate to control hydrophilic and hydrophobic content.

Examples of suitable acid catalysts are various inorganic acids, such as sulfuric acid, hydrochloric acid, phosphoric acid, nitric acid, and various organic acids, such as methanesulfonic acid or p-toluenesulfonic acid. In a preferred embodiment, sulfuric acid, hydrochloric acid, or methanesulfonic acid are used.

The level of acid catalyst used has a significant impact on the reaction efficiency. If the piperidone derivative employed in this modification reaction is in its free base form, more than 1.0 molar equivalents of acid catalyst relative to the piperidone is required since the first acid equivalent will neutralize the amine. Additional acid beyond this one molar equivalent is then required to catalyze the actual ketalization reaction with the poly(vinyl alcohol). Neutralized piperidone derivatives are commercially available and if these compounds are used in the modification reactions, then only a catalytic amount of acid is required. Acid catalyst levels can range from 0.20 to 2.0 molar equivalents relative to the neutralized piperidone derivative. In a preferred embodiment, 0.50 to 1.5 equivalents is used relative to the neutralized piperidone derivative.

Reaction temperatures typically range from 40 to 70° C., preferably, the refluxing temperature of the solvent; e.g., 65° C. for methanol.

After the reaction period is completed, the piperidone modified poly(vinyl alcohol) product can be isolated by filtering the cooled slurry and washing the collected solvent swollen polymer particles with fresh solvent to remove the acid catalyst and unreacted piperidone. The piperidone modified poly(vinyl alcohol) product can then be dried in a vacuum oven to remove residual solvent.

Piperidone modified poly(vinyl alcohol) reaction products can be confirmed using $^{13}$C nuclear magnetic resonance spectroscopy; a distinctive ketal carbon chemical shift signal can be found at approximately 95 ppm.

It has been found that amine functional poly(vinyl alcohol) polymers provide enhanced performance in ink jet paper coatings. Not intending to be bound by theory, it is believed the amine group in the amine functional poly(vinyl alcohol) provides a cationic charge on the paper surface which reacts with the anionic sulfonic acid groups of the direct or acid dye of the ink jet inks to form an insoluble salt. By forming an insoluble salt, the inks become waterfast on the paper surface and the lightfastness is improved compared to those paper products incorporating poly(vinyl alcohol) homopolymer or vinyl alcohol/vinyl acetate copolymer as the polymeric binder. Pigment binding strength, particularly silica pigments, is improved with the use of amine functional poly(vinyl alcohol) polymers compared to poly(vinyl alcohol) homopolymer or vinyl alcohol/vinyl acetate copolymer due to the strong absorption of the amines with the silanol groups on the silica pigment.

The use of piperidone modified poly(vinyl alcohol) in such ink jet paper coating applications display these enhanced performance features as shown in the following examples.

In addition to ink jet paper coating applications, it is believed that the amine functionalized poly(vinyl alcohol) of this invention offers an attractive alternative to other known amine functional poly(vinyl alcohol) for use as paper making additives. Poly(vinyl alcohol) or vinyl alcohol/vinyl acetate copolymers are not effective as wet strength additives or as additives in the wet-end of a paper process because they are not substantive to paper and are removed in the presence of water. However, it has been found that even low levels of amine functionality (1 to 25 mole %) incorporated into the poly(vinyl alcohol) polymer show substantive characteristics with retention in the presence of water, leading to improved physical properties under both wet-end and dry-end addition to paper.

The following examples are provided to illustrate various embodiments of the invention and are not intended to restrict the scope thereof.

EXAMPLE 1

Preparation of 2,2,6,6-Tetramethyl-4-Piperidone Modified Poly(Vinyl Alcohol)

Airvol® 523 poly(vinyl alcohol) (200 g; 88% hydrolyzed; weight average molecular weight about 120,000) was stirred in 350 ml of methanol at 65° C. for 30 minutes to swell the polymer particles This was done to allow swelling of the polymer particles to occur and facilitate uniform reaction throughout the polymer particles. To the resulting slurry was added, in one portion, 2,2,6,6-tetramethyl-4-piperidone hydrochloride (77.0 grams) and after stirring for 10 minutes at 65° C., concentrated sulfuric acid (39.5 grams) was added slowly. The resulting slurry was then stirred at 65° C. for 7 hours. After cooling to room temperature, the slurry was filtered and the collected swollen polymer particles were washed several times with fresh methanol to remove the acid and unreacted piperidone. The polymer product was then dried in a vacuum oven (65° C., 7 to 15 hours). $^{13}$C Nuclear magnetic resonance analysis of the polymer indicated 4.2 mole % piperidone ketal (42% reaction efficiency). The residual acetate groups on the starting poly(vinyl alcohol) polymer were hydrolyzed during the reaction. The product had the following composition; x=95.8% and z=4.2%:

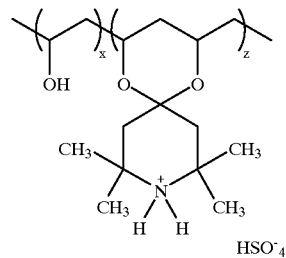

EXAMPLE 2

Preparation of 2,2,6,6-Tetramethyl-4-Piperidone Modified Poly(Vinyl Alcohol)

Airvol® 523 poly(vinyl alcohol) (200 g) was stirred in 350 ml of methanol at 65° C. for 30 minutes to swell the polymer particles and form a slurry. The slurry was added in one portion to 77.0 g of 2,2,6,6-tetramethyl-4-piperidone hydrochloride and after stirring for 10 minutes at 65° C., 38.0 g of methanesulfonic acid was added slowly. The resulting slurry was then stirred at 65° C. for 7 hours. After cooling to room temperature, the slurry was filtered and the collected swollen polymer particles were washed several times with fresh methanol to remove the acid and unreacted piperidone. The polymer product was then dried in a vacuum oven (65° C., 7 to 15 hours). $^{13}$C Nuclear magnetic resonance analysis of the polymer indicated 3.4 mole % piperidone ketal (34% reaction efficiency). The residual acetate groups on the starting poly(vinyl alcohol) polymer were hydrolyzed during the reaction, resulting in a product having the following composition, wherein x=96.6% and z=3.4%:

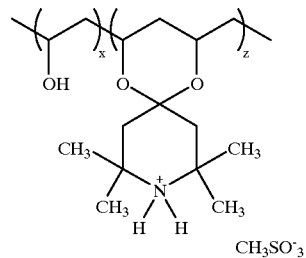

EXAMPLE 3

Preparation of 2,2,6,6-Tetramethyl-4-Piperidone Hydrochloride Modified Poly(Vinyl Alcohol)

The same procedure was followed as described in Example 2, except 0.5 equivalents of methanesulfonic acid (19.0 grams) and 200 grams of Airvol® 205 poly(vinyl alcohol) (88% hydrolyzed, weight average molecular weight about 45,000) were used. After reacting for 8 hours at 65° C., $^{13}$C nuclear magnetic resonance analysis of the polymer indicated 3.3 mole % piperidone ketal (33% reaction efficiency). All of the residual acetate groups on the starting poly(vinyl alcohol) polymer were hydrolyzed during the reaction.

EXAMPLE 4

2,2,6,6-Tetramethyl-4-Piperidone Modified Poly (Vinyl Alcohol)

Airvol® 523 poly(vinyl alcohol) (100 g) was stirred in 250 ml of methanol at 65° C. for 30 minutes to produce swollen particles. To the resulting slurry was added, in one portion, 61.4 g of 2,2,6,6-tetramethyl-4-piperidone and, after stirring for 10 minutes at 65° C., 78.4 g of concentrated sulfuric acid was added slowly. The slurry was then stirred at 65° C. for 7 hours. After cooling to room temperature, the slurry was filtered and the collected swollen polymer particles were washed several times with fresh methanol to remove the acid and unreacted piperidone. The polymer product was then dried in a vacuum oven (65° C., 7 to 15 hours). $^{13}$C Nuclear magnetic resonance analysis of the polymer indicated 4.5 mole % piperidone ketal (22.5% reaction efficiency). All of the residual acetate groups on the starting poly(vinyl alcohol) polymer were hydrolyzed during the reaction.

EXAMPLE 5

N-Methyl-4-Piperidone Modified Poly(Vinyl Alcohol)

Airvol® 523 poly(vinyl alcohol) (200 g) was stirred in 450 ml of methanol at 65° C. for 30 minutes to swell the polymer particles. To the resulting slurry was added in one portion N-methyl-4-piperidone (45.5 grams) and after stirring for 10 minutes at 65° C., concentrated sulfuric acid (78.5 grams) was added slowly. The resulting slurry was then stirred at 65° C. for 7 hours. After cooling to room temperature, the slurry was filtered and the collected swollen polymer particles were washed several times with fresh methanol to remove the acid and unreacted piperidone. The polymer product was then dried in a vacuum oven (65° C., 7 to 15 hours). $^{13}$C Nuclear magnetic resonance analysis of the polymer indicated 3.1 mole % piperidone ketal (31% reaction efficiency). The residual acetate groups on the starting poly(vinyl alcohol) polymer were hydrolyzed during the reaction, giving a product with the following composition; x=96.9% and z=3.1%:

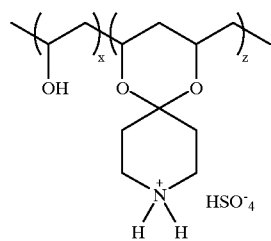

EXAMPLE 6

N-Methyl-4-Piperidone Modified Poly(Vinyl Alcohol)

Airvol® 523 poly(vinyl alcohol) (200 g) was stirred in 450 ml of methanol at 65° C. for 30 minutes. To the resulting slurry was added in one portion N-methyl-4-piperidone (68.0 grams) and after stirring for 10 minutes at 65° C., concentrated sulfuric acid (117.8 grams) was added slowly. The resulting slurry was then stirred at 65° C. for 7 hours. After cooling to room temperature, the slurry was filtered and the collected swollen polymer particles were washed several times with fresh methanol to remove the acid and unreacted piperidone. The polymer product is then dried in a vacuum oven (65° C., 7 to 15 hours). $^{13}$C Nuclear magnetic resonance analysis of the polymer indicated 8.1 mole % piperidone ketal (53.3% reaction efficiency). All of the residual acetate groups on the starting poly(vinyl alcohol) polymer were hydrolyzed during the reaction.

EXAMPLE 7

2,2,6,6-Tetramethyl-4-Piperidone Hydrochloride Modified Poly(Vinyl Alcohol)

Airvol® 205 poly(vinyl alcohol) (200 g) was stirred in 250 ml of tetrahydrofuran and 150 ml of glacial acetic acid at 65° C. for 30 minutes. To the resulting slurry was added in one portion 2,2,6,6-tetramethyl-4-piperidone hydrochloride (77.0 grams) and after stirring for 10 minutes at 65° C., methanesulfonic acid (39.3 grams) was added slowly. The resulting slurry was then stirred at 65° C. for 7 hours. After cooling to room temperature, the slurry was filtered and the collected swollen polymer particles were washed several times with fresh methanol to remove the acid and unreacted piperidone. The polymer product is then dried in a vacuum oven (65° C., 7 to 15 hours). $^{13}$C Nuclear magnetic resonance analysis of the polymer indicated 3.0 mole % piperidone ketal (30% reaction efficiency). In this case, the residual acetate groups on the starting poly(vinyl alcohol) were not hydrolyzed due to the presence of acetic acid. In fact, under the strongly acidic reaction conditions, further acetylation occurs. The product copolymer had the following composition; x=72.0%, y=25.0% and z=3.0%:

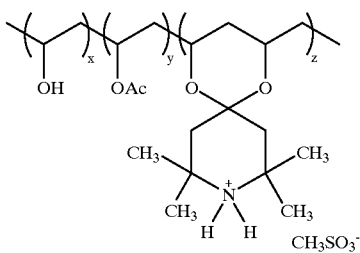

EXAMPLE 8

Piperidone Modified Poly(Vinyl Alcohol) in Ink Jet Paper Coatings

Sheets of uncoated base paper were coated for the purpose of evaluating ink jet optical density for several colors, waterfastness, and lightfastness. A paper coating dispersion was prepared by mixing 800 parts water, 100 parts silica pigment, and 40 parts of the piperidone modified poly(vinyl alcohol). In preparing the coatings a dispersion of silica pigment in water is prepared first followed by the addition of piperidone modified poly(vinyl alcohol) aqueous solution to this dispersion under high shear. The resulting dispersion was coated onto paper at a coat weight of 7 to 8 g/m$^2$, using a Meyer Rod draw down bar. After coating and drying, the sheets were printed with a Hewlett Packard 560 ink jet printer using an HP test pattern distributed by Hewlett Packard for the purpose of testing ink jet paper media. After printing the samples were measured for optical density using a Tobias IQ 200 Reflection Densitometer. The waterfastness test was performed by first measuring the monochrome black ink density after printing. The printed area was then immersed in distilled water for 30 seconds with slight agitation and dried on a hot plate under tension. The optical density was then measured again. Lightfastness was determined by measuring the optical density of ink jet printed paper before and after 71 hour UV light exposure.

Table 1 provides data on ink optical density, water resistance, and light resistance of ink jet coatings containing the piperidone modified poly(vinyl alcohol) binders versus the ink jet coatings containing a standard poly(vinyl alcohol) binder. The results show that in ink jet coatings in which a piperidone modified poly(vinyl alcohol) (Samples B–H) is used as a binder compared to poly(vinyl alcohol) homopolymer (Sample A), waterfastness is significantly improved and ink optical density is maintained with the piperidone modified poly(vinyl alcohol) binders.

ated alkyl groups on positions 1, 2, and 6, or an oxy, an oxyalkyl, or a carboxylalkyl substituent on position 1 of the piperidone.

3. The piperidone functionalized polymer of claim 1 wherein the base polymer is a poly(vinyl alcohol) and the poly(vinyl alcohol) is derived from a polymer comprising 60 to 100 mol % polymerized vinyl ester.

4. The piperidone functionalized polymer of claim 1 wherein the base polymer is a poly(vinyl alcohol) derived from a polymer comprising 60 to 100 mol % polymerized vinyl acetate.

5. The piperidone functionalized polymer of claim 1 wherein the base polymer is a poly(vinyl alcohol) having a degree of polymerization of 100 to 5,000 and a degree of hydrolysis ranging from 70 to 99%.

6. The piperidone functionalized polymer of claim 5 wherein the degree of hydrolysis of the poly(vinyl alcohol) ranges from 85 to 98%.

7. The piperidone functionalized polymer of claim 1 wherein cyclic ketal linkages comprises 1 to 20 mol % of the polymer.

TABLE 1

| Sample | Polymeric Binder[a] | Ink Optical Density | | | | Waterfastness[b] | Lightfastness[c] |
| | | Monochrome Black | Magenta | Yellow | Cyan | Composite Black | | |
|---|---|---|---|---|---|---|---|---|
| A | Airvol ® 523 | 1.16 | 0.87 | 0.61 | 1.12 | 0.82 | 51.7% | 38.5% |
| B | 2.0% TMP/MSA on Airvol ® 540 | 1.18 | 0.82 | 0.6 | 1.12 | 0.85 | 5.1% | N.D. |
| C | 3.3% TMP/MSA on Airvol ® 205 (Ex. 3) | 1.16 | 0.82 | 0.59 | 1.11 | 0.85 | 5.2% | N.D. |
| D | 3.4% TMP/MSA on Airvol ® 523 (Ex. 2) | 1.2 | 0.82 | 0.58 | 1.05 | 0.86 | 0 | 31.5% |
| E | 4.2% TMP/SA on Airvol ® 523 | 1.14 | 0.78 | 0.58 | 1.04 | 0.83 | 0 | N.D. |
| F | 6.6% TMP/SA on Airvol ® 523 | 1.1 | 0.75 | 0.57 | 1.02 | 0.8 | 0 | N.D. |
| G | 3.1% MP/SA on Airvol ® 523(Ex.5) | 1.21 | 0.82 | 0.6 | 1.11 | 0.85 | 9.1% | N.D. |
| H | 8.1% MP/SA on Airvol ® 523 (Ex.6) | 1.25 | 0.81 | 0.59 | 1.04 | 0.85 | 0 | N.D. |

[a]TMP = 2,2,6,6-tetramethyl-4-piperidone. MP = N-methyl-4-piperidone. MSA = methanesulfonic acid catalyst. SA = sulfuric acid catalyst.
[b]% loss of monochrome black ink optical density upon 30 second water soak.
[c]Total % ink loss (all colors) upon 71 hour UV irradiation.

We claim:

1. A piperidone functionalized polymer derived from a base polymer having a plurality of hydroxyl groups, wherein the piperidone or piperidone derivative reacts with the base polymer to form a cyclic ketal linkage with pendent hydroxyl groups on adjacent or alternating carbon atoms of the base polymer.

2. The piperidone functionalized polymer of claim 1 wherein the piperidone derivative has, independently, zero to two hydrogen, methyl, or $C_2$ to $C_4$ saturated or unsatur- 8. The piperidone functionalized polymer of claim 1 wherein cyclic ketal linkages comprise 5 to 15% of the polymer.

9. The piperidone functionalized polymer of claim 1 wherein the piperidone derivative is selected from the group consisting of 4-piperidone, 2,2,6,6-tetramethyl-4-piperidone, 2,2,6,6-tetramethyl-4-piperidone-1-oxyl, and N-methyl-4-piperidone.

10. A piperidone functionalized poly(vinyl alcohol) having the following general formulae:

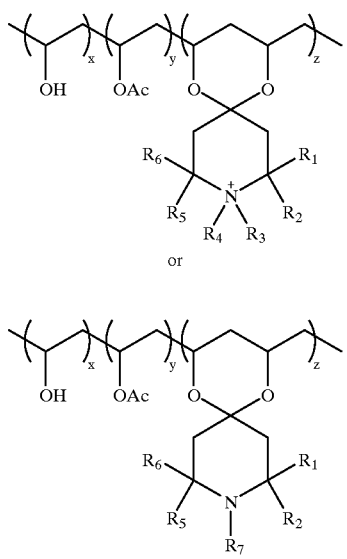

wherein $R_1$ through $R_6$ are each independently hydrogen, methyl, or a $C_2$ to $C_4$ saturated or unsaturated alkyl groups, $R_7$ is O• or $OR_8$, wherein $R_8$ is hydrogen or a $C_1$ to $C_4$ alkyl or C(=O)-($C_1$ to $C_4$)-alkyl group; $X^-$ is a salt; x ranges from 50 to 99 mol %; y ranges from 0 to 30 mol %; and z ranges from 1 to 20 mol %.

11. The piperidone functionalized poly(vinyl alcohol) of claim 10 wherein x ranges from 73 to 94 mol %, y ranges from 1 to 12 mol %, z ranges from 5 to 15 mol %, and $X^-$ is selected from the group consisting of chloride, sulfate, hydrogen sulfate, methanesulfonate, phosphate, and nitrate.

12. The piperidone functionalized poly(vinyl alcohol) of claim 10 represented by Formula I, wherein $R_1$, $R_2$, $R_5$, and $R_6$ are each methyl, $R_3$ and $R_4$ are each hydrogen, and $X^-$ is chloride, sulfate or methanesulfonate.

13. The piperidone functionalized poly(vinyl alcohol) of claim 10 represented by Formula I, wherein $R_3$ is methyl, and $R_1$, $R_2$, $R_4$, $R_5$, and $R_6$ are each hydrogen, and $X^-$ is chloride, sulfate or methanesulfonate.

14. The piperidone functionalized poly(vinyl alcohol) of claim 10 represented by Formula I, wherein $R_1$ through $R_6$ are each hydrogen, and $X^-$ is chloride, sulfate or methanesulfonate.

15. The piperidone functionalized poly(vinyl alcohol) of claim 10 represented by Formula II, wherein $R_1$, $R_2$, $R_5$, and $R_6$ are each methyl and $R_7$ is O•.

16. The piperidone functionalized poly(vinyl alcohol) of claim 10 wherein the piperidone functionalized poly(vinyl alcohol) is formed by acid catalyzed ketalization of poly(vinyl alcohol) with piperidone or a piperidone derivative.

17. The piperidone functionalized poly(vinyl alcohol) of claim 10 wherein the poly(vinyl alcohol) has a weight average molecular weight ranging from 5,000 to 300,000.

* * * * *